United States Patent
Lampe-Juergens

(10) Patent No.: US 11,323,785 B1
(45) Date of Patent: May 3, 2022

(54) METER HEALTH FUNCTION

(71) Applicant: Honeywell International Inc., Morris Plains, NJ (US)

(72) Inventor: Christian Lampe-Juergens, Spelle (DE)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/247,129

(22) Filed: Dec. 1, 2020

(51) Int. Cl.
*H04Q 9/02* (2006.01)
*G06F 1/3206* (2019.01)

(52) U.S. Cl.
CPC ............ *H04Q 9/02* (2013.01); *G06F 1/3206* (2013.01); *H04Q 2209/43* (2013.01); *H04Q 2209/60* (2013.01); *H04Q 2209/88* (2013.01)

(58) Field of Classification Search
CPC .. H04Q 9/02; H04Q 2209/43; H04Q 2209/60; H04Q 2209/88; G06F 1/3206
See application file for complete search history.

(56) References Cited

U.S. PATENT DOCUMENTS

| | | | |
|---|---|---|---|
| 4,384,925 A | 5/1983 | Stetter et al. | |
| 4,596,144 A * | 6/1986 | Panton | G01F 23/2962 73/290 V |
| 5,969,263 A | 10/1999 | Ligneul et al. | |
| 6,766,276 B1 | 7/2004 | Dury | |
| 8,631,712 B2 | 1/2014 | Zhu et al. | |
| 8,955,392 B2 | 2/2015 | Liu et al. | |
| 9,671,269 B2 | 6/2017 | Berger | |
| 9,797,765 B2 | 10/2017 | Nagai | |
| 2007/0192046 A1* | 8/2007 | Hairston | F04C 14/28 702/45 |
| 2012/0229295 A1* | 9/2012 | Sharma | G01D 4/002 340/870.02 |
| 2015/0276433 A1* | 10/2015 | Brahmajosyula | G01D 4/02 340/870.02 |
| 2017/0175741 A1* | 6/2017 | Nishikawa | F04C 2/3446 |
| 2019/0145804 A1* | 5/2019 | Artiuch | G01F 1/075 73/198 |
| 2020/0149944 A1 | 5/2020 | Haag et al. | |

FOREIGN PATENT DOCUMENTS

| | | |
|---|---|---|
| CN | 104515560 B | 4/2015 |
| CN | 109358306 A | 2/2019 |
| CN | 109598353 A | 4/2019 |

(Continued)

*Primary Examiner* — Amine Benlagsir
(74) *Attorney, Agent, or Firm* — John Maldjian; Stevens & Lee PC

(57) ABSTRACT

The system a gas meter configured to determine a meter health factor based on a power management criteria, ageing criteria, wear out criteria, accuracy impacting criteria, and an alarm state. The gas meter can determine if the meter health factor indicates if functioning is intact, if functioning is intact or assistance and repair is needed immediately or at a future time interval based on the power management criteria, ageing criteria, wear out criteria, accuracy impacting criteria, and an alarm state. The gas meter informs a head end system that the assistance and repair is required. The head end system receives information that the assistance and repair is required, and obtains the required assistance and repair from one or more external sources.

20 Claims, 8 Drawing Sheets

(56) References Cited

FOREIGN PATENT DOCUMENTS

| | | | |
|---|---|---|---|
| CN | 110068789 | A | 7/2019 |
| CN | 110927654 | A | 3/2020 |
| EP | 1064522 | A1 | 1/2001 |
| JP | 2584935 | B2 | 11/1996 |
| JP | 4024110 | B2 | 12/2007 |
| JP | 5351742 | B2 | 11/2013 |
| KR | 20180056003 | A | 5/2018 |

\* cited by examiner

METER HEALTH FUNCTION

TECHNICAL FIELD

The present disclosure generally relates to a meter health function. More specifically, the present invention provides a system wherein each gas meter within the system continuously self-checks its overall functioning within the system.

BACKGROUND

Gas meters in Europe can be installed for more than twenty years, and gas meters in the United States can be installed for more than thirty years in a distribution net. A meter operator typically has to do a spot check of all the gas meters in a distribution net. If the gas meters from the spot check are within their accuracy limits, then the whole production can remain in place. However, if one or more of the gas meters are not functioning properly or above the infield threshold, then the whole production lot needs to be taken out of the distribution net and recalibrated.

A drawback for this procedure is that the procedure can be expensive and cost prohibitive. In addition the meter operator would like to have information about the accuracy level and other meter health factors such as the battery lifetime of the gas meters. The meter operator would also like to be aware of ageing criteria and how dust accumulation can be affecting the accuracy of the gas meters. Currently, meter operators cannot get rid of sample production batch checks.

Accordingly, there is a need to be able to know the meter health factor with the gas meter in a more cost and time effective manner. Moreover, the functioning of various components and sensors should be known without having to recalibrate a whole production batch of gas meters due to only some of the gas meters not having their functioning intact.

As such, there is a need for gas meter to be able to determine its overall functioning independently of the meter operator, and determine what part of its functioning is normal and intact, and what part of its functioning needs to be addressed. Gas meters being able to perform continuous self-checking of their overall functioning can reduce the time and cost of meter operators having to check each gas meter, and for an entire production batches to have to be recalibrated in response to some gas meters not functioning properly.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments is to provide an improved means for gas meters to perform self-checking on their overall functioning.

It is another aspect of the disclosed embodiments to provide for a gas meter to continuously check its overall functioning.

It is another aspect of the disclosed embodiments to provide a method and system for a gas meter to determine its functioning based on a series of criterias.

The aforementioned aspects and other objectives can now be achieved as described herein. In an embodiment, a gas meter is configured to determine a meter health factor based on a power management criteria, ageing criteria, wear out criteria, accuracy impacting criteria, and an alarm state. The gas meter determines if the meter health factor indicates if functioning is intact or if assistance or repair is needed immediately or at a future time interval based on the power management criteria, ageing criteria, wear out criteria, accuracy impacting criteria, and/or the alarm state. The gas meter notifies a head end system that the meter health factor indicates that the assistance and repair is required. The head end system is configured to receive information about the gas meter's meter health factor that indicates that the assistance and repair is required. The head end system obtains the required assistance and repair from one or more external sources.

In an embodiment of the system, a green light for the power management criteria indicates that the meter health factor is intact in relation to the power management criteria.

In an embodiment of the system, the gas meter reports when a battery is damaged or empty to the head end system.

In an embodiment, a system can include a plurality of sensors and/or components each providing one or more specific functions. A gas meter is configured to determine a meter health factor based on a power management criteria, ageing criteria, wear out criteria, accuracy impacting criteria, and an alarm stage. The power management criteria, ageing criteria, wear out criteria, accuracy impacting criteria, and the alarm stage are based on a functioning of the plurality of sensors and/or components. The gas meter determines whether the meter health factor indicates whether the functioning is intact, whether the functioning is intact but assistance and repair is required at a future time interval, or whether the functioning is not intact and immediate assistance or repair is required. The gas meter reports to a head end system that the assistance or repair is required based on the meter health factor. The head end system is configured to receive information from the gas meter on the meter health factor. The head end system requests assistance from a plurality of external sources to provide the required assistance and repair.

In an embodiment of the system, the gas meter continuously monitors the power management criteria to determine if a battery needs to be replaced.

In an embodiment of the system, the gas meter determines if a flow rate profile and total volume are normal.

In an embodiment of the system, the gas meter determines if dust is affecting the accuracy impacting criteria.

In an embodiment of the system, the gas meter determines if a voltage of the gas meter is normal but also requires assistance at the future time interval.

In an embodiment of the system, the gas meter notifies the head end system that a volume and flow rate of the gas meter have to be addressed at the future time interval.

In an embodiment of the system, the gas meter determines that it requires immediate repair due to its voltage and energy level.

In another embodiment, a method includes configuring a gas meter in a gas supply net to determine a meter health factor based on a power management criteria, ageing criteria, wear out criteria, accuracy impacting criteria and an alarm state. The method includes determining, by the gas meter, if the meter health factor indicates if functioning is intact or if the functioning is intact but needs assistance and repair at a future time interval, of if the functioning is not intact and immediate assistance and repair is needed based on the power management criteria, ageing criteria, wear out criteria, accuracy impacting criteria, and/or the alarm state. The method also includes notifying a head end system, by the gas meter, that the meter health factor indicates that the assistance and repair is required. The method also includes configuring the head end system to receive information about the gas meter that needs the required assistance and repair. The head end system obtains the assistance and repair from one or more external sources.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

Figure 1:
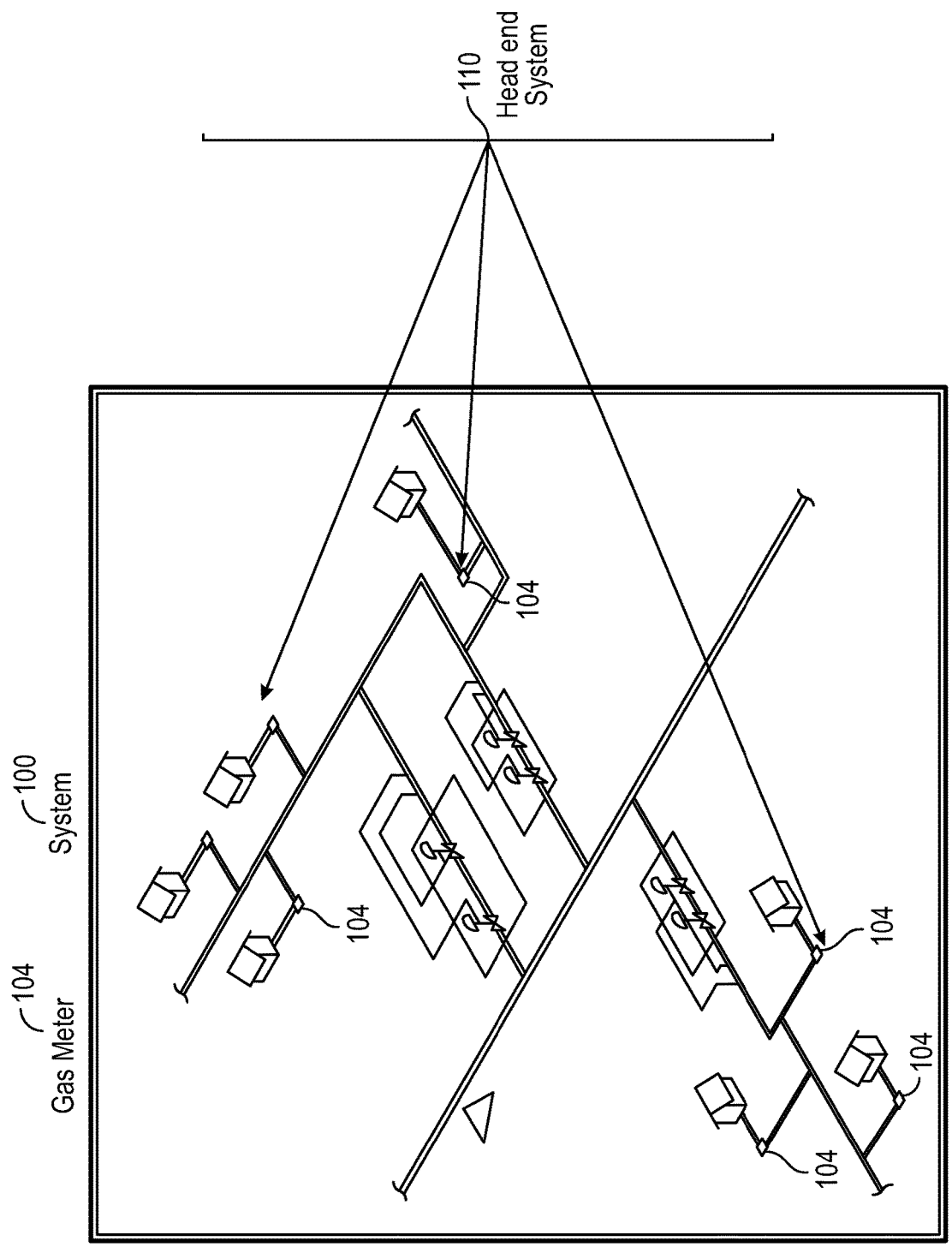
FIG. 1 illustrates a diagram of a system, which can be implemented in accordance with an embodiment.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. IN addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the, again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc.* v. *H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function(s) of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

Introduction

Embodiments of the present invention include a system with gas meters. Each gas meter can be configured to its meter health factor based on a series of criteria's. The series of criteria's include a power management criteria, ageing criteria, wear-out criteria, accuracy impacting criteria, and an alarm state.

The power management criteria is based on the battery, voltage and energy level of the gas meter. The ageing criteria is based on an age of the gas meter and long-term higher temperature and pressure. Further, the wear-out criteria is based on the total volume counted and a flow rate indicator for the gas meter. The accuracy impacting criteria is based on a gain and signal amplitude from an ultrasonic sensor, wherein the dust impact on the gain and signal amplitude is monitored. The alarm state is based on a normal temperature and pressure within the gas meter, wherein there is no type of tamper attack on the system and the self-check of the gas meter appears normal.

The gas meter can determine its meter health factor based on the criteria's described above. The gas meter determines based on the power management criteria, ageing criteria, wear-out criteria, accuracy impacting criteria and alarm state whether its overall functioning is intact. Further, the gas meter can also determine based on the criteria's that its some of its functioning, or its overall functioning is intact, but later needs assistance and repair within the next twelve months, or at another future time interval. In addition, the gas meter can determine based on the above-mentioned criteria's, whether any part of its overall functioning is damaged and in immediate need of repair, assistance. Further, if any part of the gas meter's functioning is damaged or not intact, the gas meter can determine that the replacement or recalibration of the necessary components of the gas meter has to occur.

System Structure

FIG. 1 illustrates a block diagram of a system 100, which can be implemented in accordance with an embodiment. The system 100 can include gas meters 104 and a head end system 110. For convenience/ease of explanation, the description of a single gas meter 104 that is applicable to each of the gas meters 104, will be described. The gas meter 104 can perform a self-check on each of its overall functioning within the system 100.

Referring to FIG. 1, the gas meter 104 is configured to continuously check its overall functioning within the system 100. The gas meter 104 can identify what its meter health factor is according to determine its overall functioning. Moreover, the gas meter 104 can determine its meter health factor based on the power management criteria, wear-out criteria, ageing criteria, accuracy impacting criteria, and the alarm state.

Still referring to FIG. 1, the power management criteria relates to the voltage and energy level in relation to the battery of the gas meter 104. As such, the gas meter 104 will continuously determine if the functioning of the voltage level, energy level, and the battery are intact. The gas meter 104 can eventually determine at a later time that the functioning of the voltage level, energy level, and battery are intact, but that they need assistance within the next 12 months or at another future time interval. The gas meter 104 can also determine that the voltage and energy level, and the battery need immediate assistance, to where the battery may need to be replaced.

In FIG. 1, with respect to the wear-out criteria, the gas meter 104 can determine the total volume and flow rate indicator. As with the power management criteria, the gas meter 104 can determine if the functioning of the volume and flow rate indicator is intact, or is intact but needs to be serviced within the next twelve months or at a later time interval. In addition, the gas meter 104 can also determine that the volume and flow rate indicator need immediate attention and assistance.

With respect to FIG. 1, the ageing criteria relates to the age of the gas meter 104, and also to the long-term higher temperature and pressure of the gas meter 104. The age of the gas meter 104 is a stress factor, wherein high temperature and pressure could be stress factors as well. The criteria indicate that the gas meter 104 is not stressed too much by the age, temperature, and pressure.

In FIG. 1, the accuracy impacting criteria involves the gain and signal amplitude from an ultrasonic sensor configured within the gas meter 104. The gas meter 104 will continuously determine if the gain and signal amplitude are intact. Accordingly, the gas meter 104 will also determine if the gain and signal amplitude of the ultrasonic sensor are intact but have to be addressed within the next twelve months, or if immediate attention is required.

Still in FIG. 1, the alarm state refers to normal pressure and temperature within the gas meter 104 when there is no tamper attack and the self-check of meter firmware and meter hardware appears normal. The gas meter 104 will determine if the gas meter is in normal pressure and temperature range and is intact. The gas meter 104 will also determine if the gas meter is not in normal pressure and temperature range and is intact, but needs service at a later time interval, or needs immediate assistance.

In FIG. 1, when the gas meter performs the self-check on each of the criteria's described above, and determines that assistance and repair is needed either at a later time interval, or is needed immediately, the gas meter 104 will inform the head end system 110. The head end system 110 will receive the information on the needed assistance and repair from the gas meter 104. In response, the head end system 110 can contact one or more external sources to provide the assistance and repair to the gas meter 104. Moreover, the head end system 110 can contact certain external sources based on the type of assistance, repair, replacement, or recalibration that is needed for the gas meter 104.

Referring to FIG. 2, a gas meter 200 that can be found in the system of FIG. 1 is illustrated. The gas meter 200 can include meter housing that includes a pressure sensor and a temperature sensor. The gas meter 200 can also include a public boundary/meter index with a second pressure sensor and public interface to communicate with the head end system.

Figure 2A:
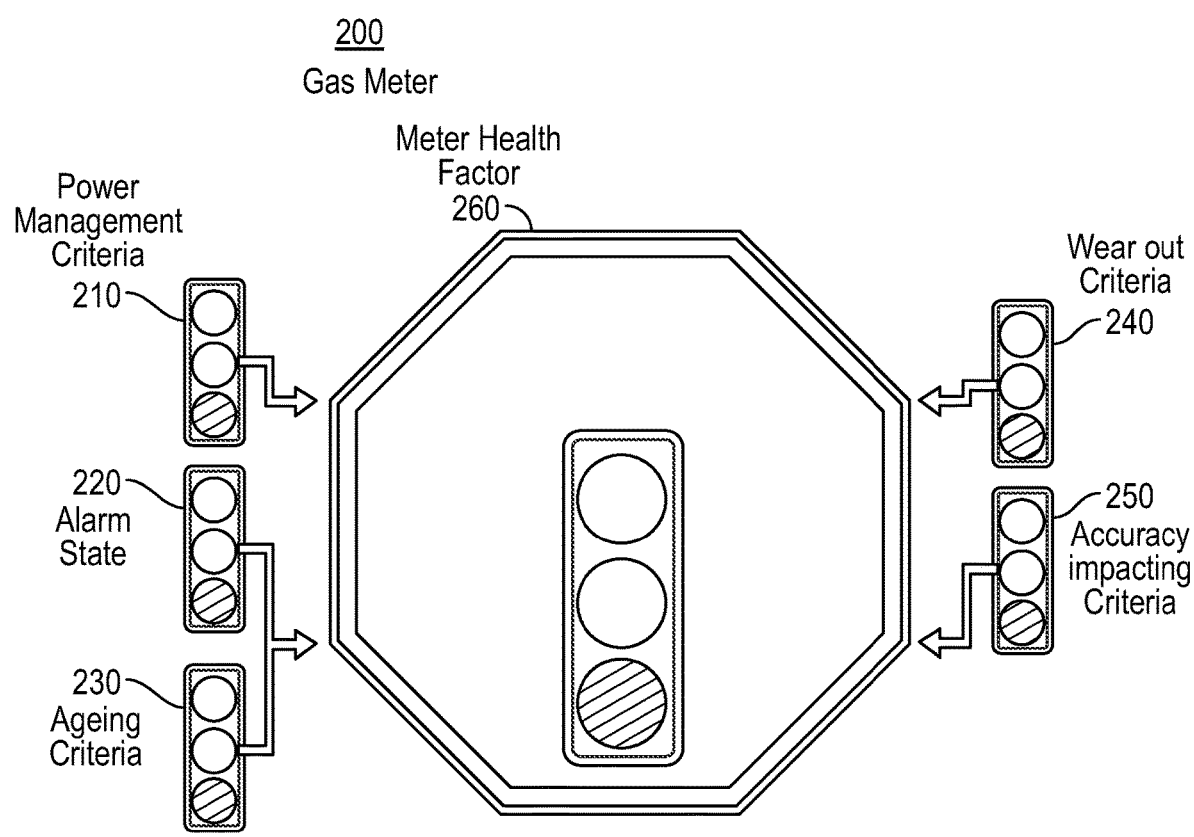
FIG. 2(a) illustrates a schematic diagram of a meter health function inside of a gas meter in accordance with an embodiment.

In FIG. 2(a), a gas meter 200 is illustrated, along with the power management criteria 210, alarm state 220, ageing criteria 230, wear out criteria 240, and accuracy impacting criteria 250. The power management criteria 210, alarm state 220, ageing criteria 230, wear out criteria 240, and accuracy impacting criteria 250 enable the gas meter 200 to determine its meter health factor 260. As such, a light color level (green, yellow, red) can determine if any of the criteria's are intact, are intact but need assistance at a later time interval, or are not intact and need immediate assistance that could entail repair, replacement, or recalibration. In this embodiment, the power management criteria 210, alarm state 220, ageing criteria 230, wear out criteria 240, and accuracy impacting criteria 250 all indicate a green light color level. As such, the overall functioning with respect to the meter health factor 260 for the gas meter 200 is intact.

Figure 2B:
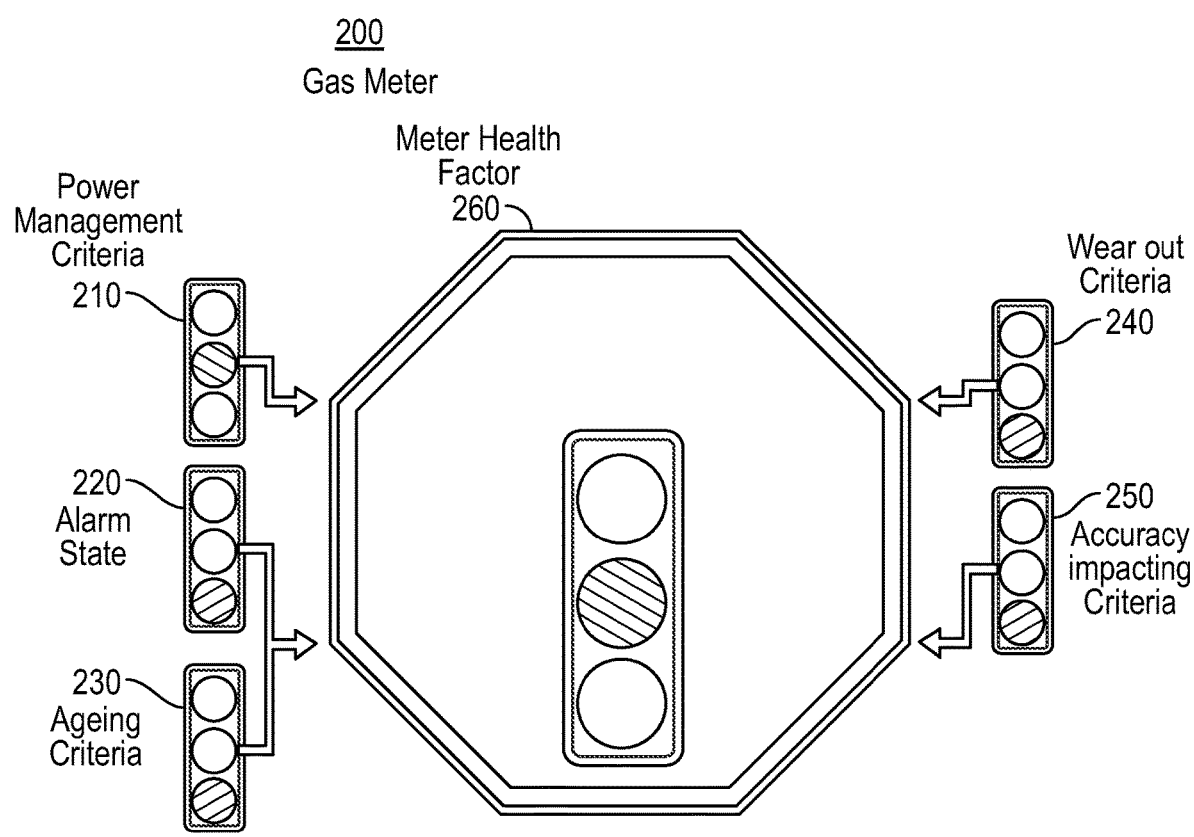
FIG. 2(b) illustrates a diagram of a meter health factor inside of a gas meter in accordance with an embodiment.

In FIG. 2(b), the power management criteria 210 shows a yellow light color level. Accordingly, the meter health factor 260 in relation to the power management criteria 210 is intact. However, the battery, voltage, and/or energy level of the gas meter 200 will need assistance, repair, and/or recalibration within the next twelve months, or at a future time interval. As such, the battery and the voltage and energy level will need to be addressed for service at a later time. The gas meter 200 can inform the head end system that it needs assistance and repair at a future time interval. The Meter Health Factor 260 with respect to the alarm state 220, ageing criteria 230, wear out criteria 240 and accuracy impacting criteria remain intact due to each showing a green light color level.

Figure 2C:
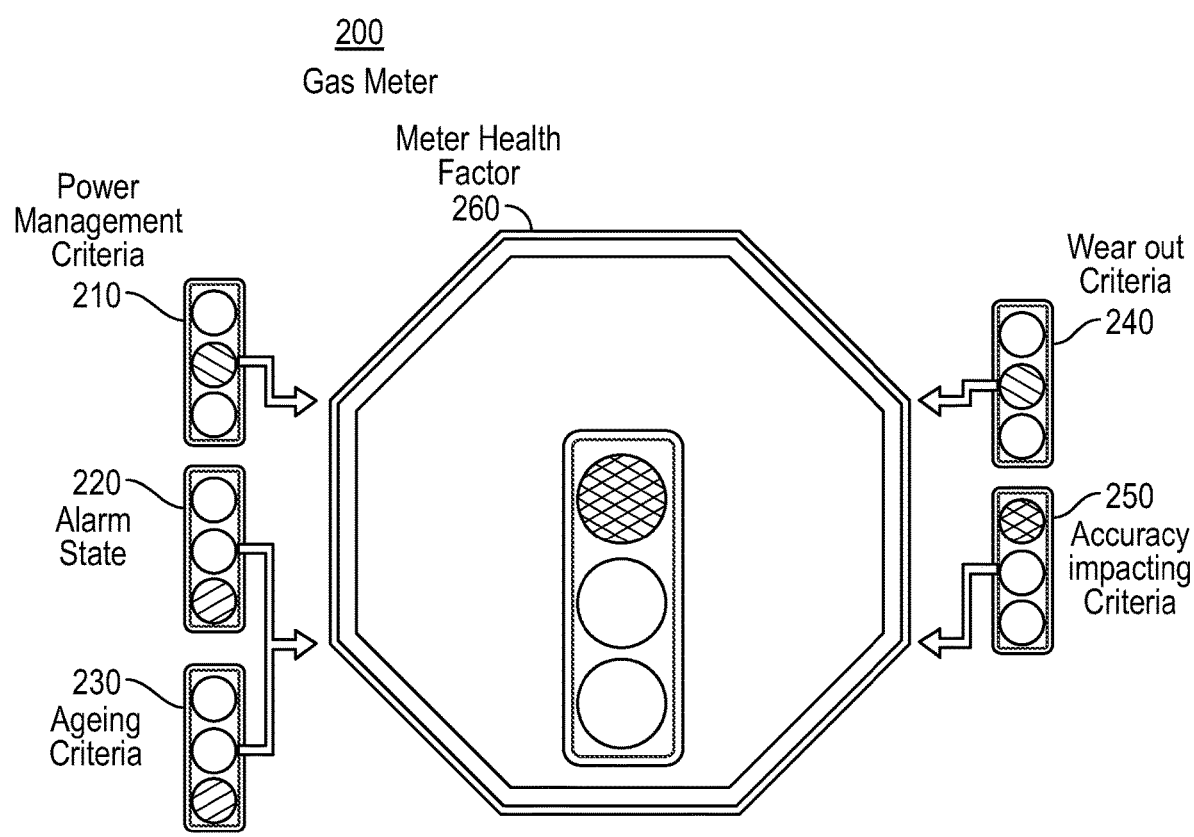
FIG. 2(c) illustrates a diagram of a meter health factor within a gas meter in accordance with an embodiment.

In FIG. 2(c), both the power management criteria 210 and the wear out criteria 240 indicate a yellow light color level. Accordingly, the meter health factor 260 in relation to the power management criteria and wear out criteria is intact, but needs to be addressed for service in the next twelve months or at a future time interval. The gas meter 200 can inform the head end system that it will need service at a later time interval or within the next twelve months. The total volume and flow rate indicator for the gas meter 200 is intact, but will need service at a later time interval. Similarly, the battery, voltage, and energy level of the gas meter 200 is also intact, but will need assistance and service within the next twelve months or at a future time interval. The meter health factor 260 in relation to the alarm state 220 and ageing criteria 230 are intact due to the green light color level for the alarm state 220 and the ageing criteria 230.

In FIG. 2(c), with respect to the accuracy impacting criteria 250, a red light color level is shown. Therefore, the gain and signal amplitude from the ultrasonic sensor within the gas meter 200 needs immediate attention. The gas meter 200 can inform the head end system that it needs to be serviced immediately in relation to its accuracy impacting criteria 250. The head end system can obtain assistance from one or more external sources. The external sources can provide the repair or recalibration that the gas meter 200 requires in relation to its accuracy impacting criteria 250.

Figure 2D:
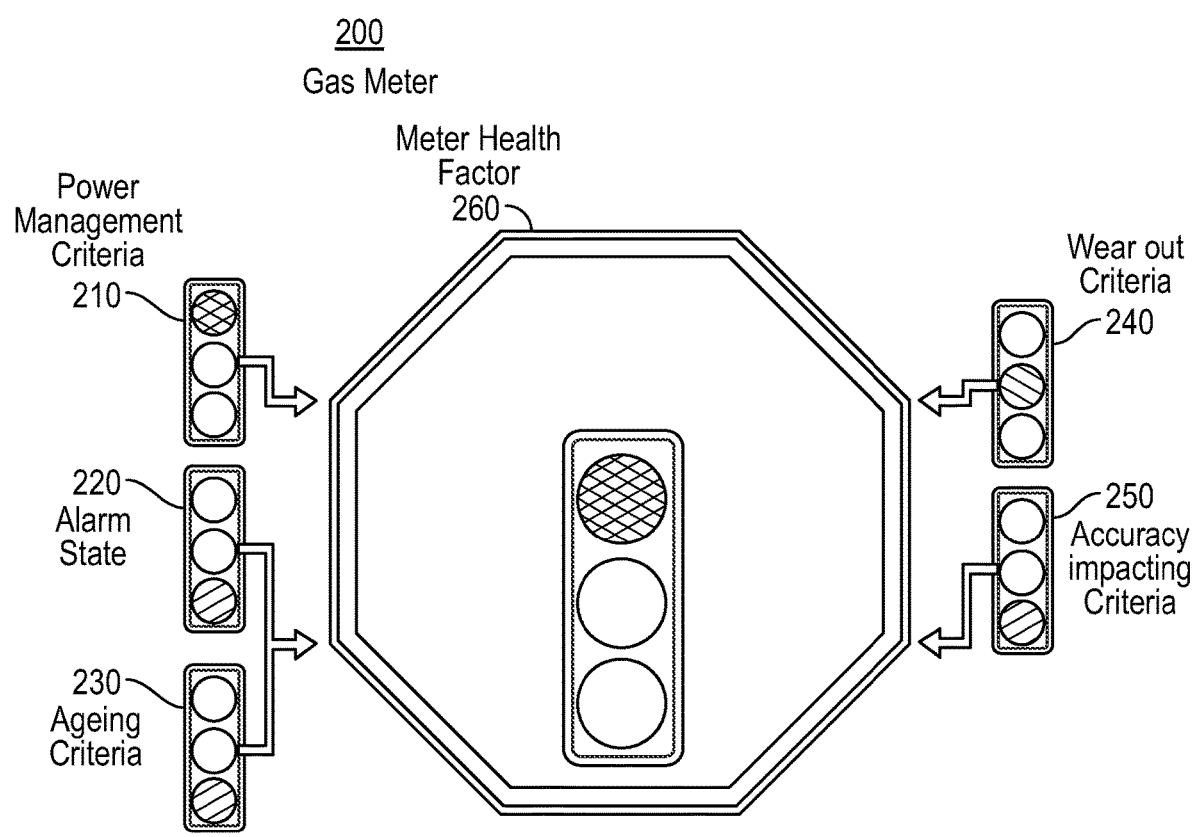
FIG. 2(d) illustrates another diagram of a meter health factor within a gas meter in accordance with an embodiment.

With respect to FIG. 2(d), the meter health factor 260 in relation to the power management criteria 210 is not intact. A red light color level for the power management criteria 210 is shown. In response, the gas meter 200 can contact the head end system that its battery needs to be serviced and even replaced, and that it needs immediate service in relation to its voltage and energy level. The head end system can locate the required assistance from the one or more external sources to enable the battery of the gas meter 200 to be serviced, recalibrated, or replaced. The head end system can also obtain the assistance needed to immediately address the voltage and energy level in relation to the battery for the gas meter 200 as well.

In FIG. 2(d), the meter health factor 260 in relation to the alarm state 220, ageing criteria 230, and accuracy impacting criteria 250 is intact, as a green light color level is indicated for the alarm state 220, the ageing criteria 230, and the accuracy impacting criteria 250. Further, the meter health factor 260 is also intact in relation to the wear out criteria 240. However, as indicated by the yellow light color level, the gas meter 200 needs to be serviced at a later time interval or within the next twelve months with respect to the wear out criteria 240, and the total volume and flow rate indicator within the gas meter 200. The gas meter 200 can inform the head end system that it needs future service within the next twelve months or at a future time interval due to is wear out criteria 240.

Figure 3:
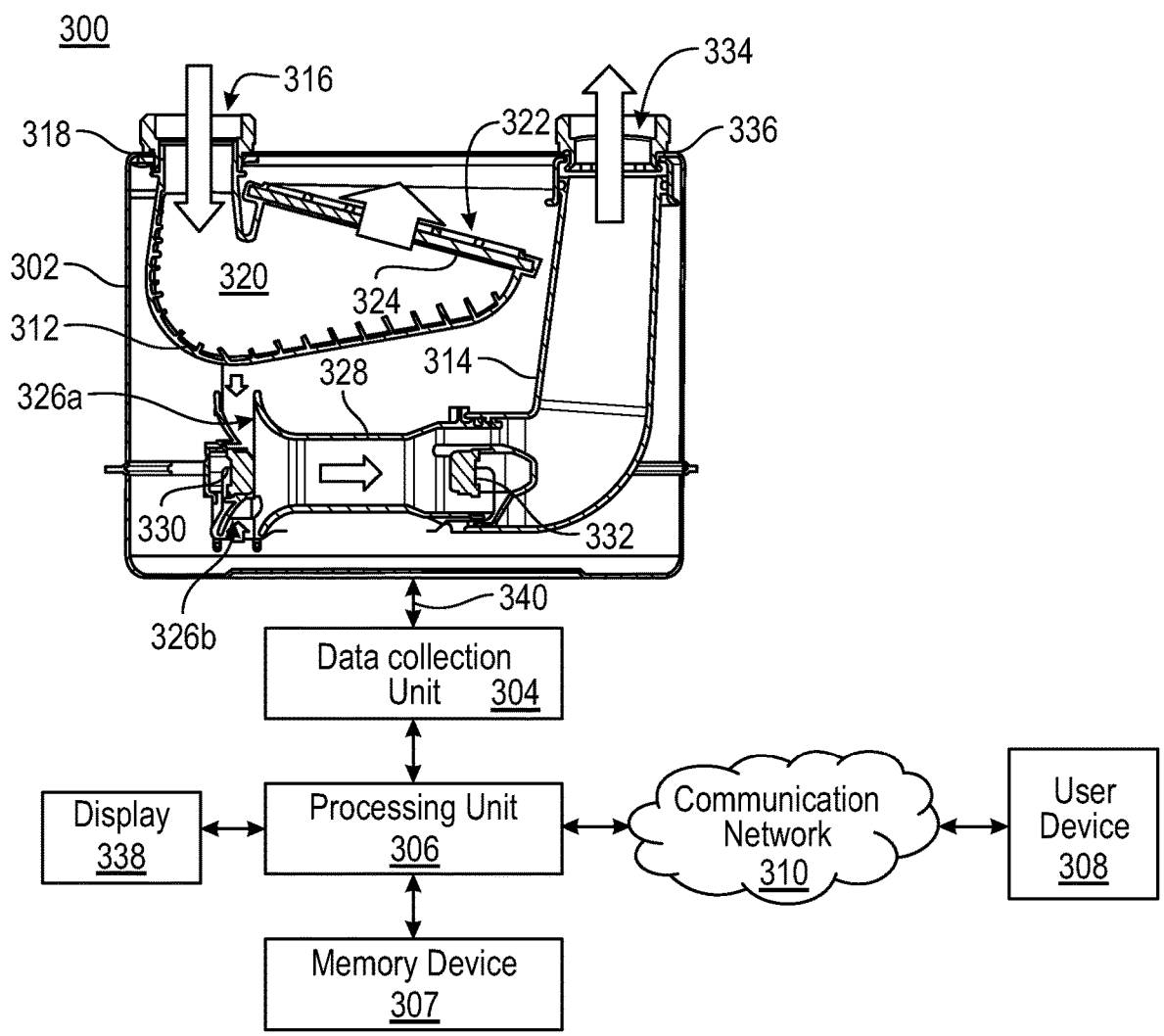
FIG. 3 illustrates a diagram of an ageing and dust detection system in accordance with an embodiment.

FIG. 3 is a diagram illustrating an ageing and dust detection system 300. The ageing and dust detection system 300 may be configured to detect a reason for a fault in a measurement of a gas meter 302 when the gas meter 302 fails in a field.

In FIG. 3, the ageing and dust detection system 300 may comprise the gas meter 302, a data collection unit 304, a processing unit 306, and a user device 308. Further, the gas meter 302, the data collection unit 304, and the processing unit 306 may be configured to communicate with each other by one or more communication mediums. Moreover, embodiments of the present mechanism may include any of the communication medium known to a person skilled in the art that may be capable of enabling a communication within the ageing and dust detection system 300. Further, the processing unit 306, and the user device 308 may be connected through a communication network 310, according to embodiments of the present mechanism. In addition, embodiments of the present mechanism may include any of the communication network 310 known to a person skilled in the art that may be capable of enabling a communication within the ageing and dust detection system 300. The processing unit 306, and the user device 308 may be configured to communicate with each other by one or more communication mediums connected to the communication network 310. Embodiments of the present mechanism may include any of the communication mediums known to a person skilled in the art that may be capable of enabling a communication within the ageing and dust detection system 300.

In FIG. 3, the gas meter 302 may be connected to a pipeline (not shown) to measure a flow rate of a gas passing through the gas meter 302. Further, the gas meter 302 may comprise a multifunctional dust trap 312, and a flow tube 314. According to embodiments of the present mechanism, the multifunctional dust trap 312 and the flow tube 314 may be made up of a material, such as, but not limited to, a natural plastic, a Polybutylene Terephthalate (PBT) material, a Thermoplastic elastomers (TPE), and so forth. Embodiments of the present mechanism may include any of the material for making the multifunctional dust trap 312 and the flow tube 314 known to a person skilled in the art that may be capable of providing a durability to the multifunctional dust trap 312 and the flow tube 314.

In FIG. 3, the multifunctional dust trap 312 may comprises an inlet 316 that may be connected to a gas inlet 318 of the gas meter 302. A flow of the gas may enter from the inlet 316 into a chamber 320 of the multifunctional dust trap 312. According to an embodiment of the present mechanism, a larger cross-sectional area of the chamber 320 in comparison with the inlet 316 may cause a drop in a velocity of the flow of the gas. Further, the chamber 320 may guide the flow of the gas towards an outlet 322 of the multifunctional dust trap 312. The outlet 322 may comprise a filter mat 324 fixedly attached to the outlet 322 for filtering a plurality of micro-dust particles (hereinafter referred to as the micro-dust particles). The filter mat 324 may filter the gas thus eliminating the micro-dust particles from the gas to produce a clean gas. Further, the clean gas may enter the flow tube 314 installed within the gas meter 302. The flow tube 314 may comprise a plurality of flow inlets 326a-326b (hereinafter referred to as the flow inlets 326) for enabling a balanced flow of the gas into a flow chamber 328 of the flow tube 314. The flow tube 314 may further comprise a first transducer 330 connected near a first end of the flow chamber 328 and a second transducer 332 connected near a second end of the flow chamber 328.

In FIG. 3, the first transducer 330 and the second transducer 332 may be a device capable of converting an electrical energy into a plurality of acoustic waves (hereinafter referred to as the acoustic waves). Further, the first transducer 330 and the second transducer 332 may be connected in the flow tube 314 such that the first transducer 330 and the second transducer 332 faces each other. The first transducer 330 may be configured to transmit the generated acoustic waves towards the second transducer 332 and the second transducer 332 may be configured to transmit the generated acoustic waves towards the first transducer 330. Further, an outlet 334 of the flow tube 314 may be connected to a gas outlet 336 of the gas meter 302. The gas outlet 336 may be connected to the pipeline (not shown) that may receive the flow of the clean gas from the flow tube 314, according to an embodiment of the present mechanism.

In FIG. 3, the gas meter 302 may comprise a display 338 connected to the processing unit 306 that may be configured to display an output generated by the processing unit 306, according to an embodiment of the present mechanism. The display 338 may be, but not limited to, a digital display, a touch screen display, and so forth. Embodiments of the present mechanism may include any of the display 338 known to a person skilled in the art that may be capable of displaying the output generated by the processing unit 306.

In FIG. 3, the data collection unit 304 may also be configured to collect the temperature inside the gas meter 302, the time of the gas meter 302 in the field, the accumulated volume of the flow, the amplitude of the signal, the shape of the signal, the gain amplification from the automatic-gain-control, the resonance frequency, the capacity of the filter mat 324, and the resistance of the filter mat 324 through an electrical circuit (not shown) of the gas meter 302, in an embodiment of the present mechanism. Further, the data collection unit 304 may be configured to transmit the collected data to the processing unit 306. The processing unit 306 may be configured to receive and/or transmit data within the ageing and dust detection system 300 using the communication network 310. Further, the processing unit 306 may be configured to process data associated with the ageing and dust detection system 300 to generate the output.

Referring to FIG. 3, the gas meter 302 within the ageing and dust detection system 300 can continuously check the various components described above based on the power management criteria, alarm state, ageing criteria, wear out criteria, and accuracy impacting criteria described above in FIGS. 2(a)-(d). Accordingly, within the ageing and dust detection system 300, the gas meter 302 can determine its meter health factor according to the above-described components that are part of either the power management criteria, alarm state, ageing criteria, wear out criteria, or accuracy impacting criteria. Further, the gas meter 302 can determine if the functioning of any of the components is intact. In addition, the gas meter 302 can determine if any of the components are intact but need assistance and repair in the next twelve months or at a future time interval. In addition, the gas meter 302 can determine if any part of its functioning is not intact and needs immediate assistance and repair, replacement, or recalibration. The gas meter 302 can contact the head end system when assistance and repair is needed. In response, the head end system can obtain the assistance and repair for the gas meter 302 from one or more external sources.

Figure 4:
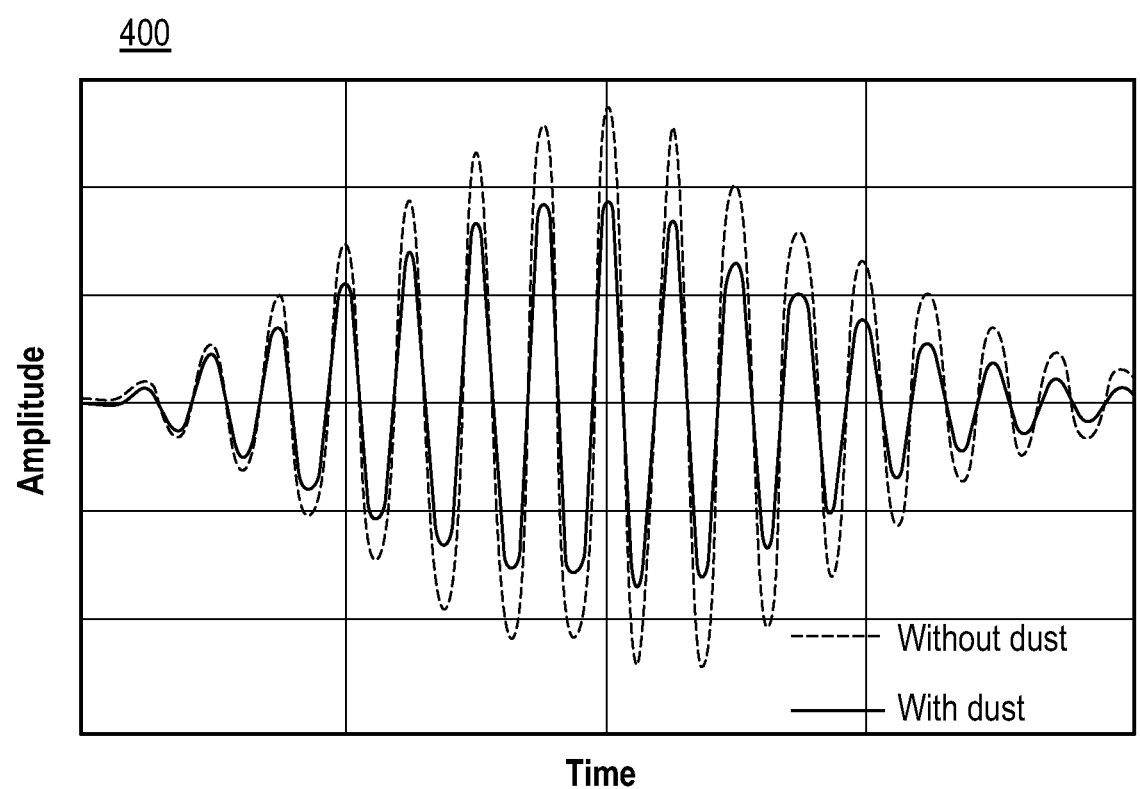
FIG. 4 illustrates a graph of a signal amplitude with and without dust in accordance with an embodiment.

In FIG. 4 a graph 400 is illustrated that depicts an amplitude of the acoustic waves of the wave package, with a signal amplitude shown with dust and a signal amplitude shown without dust. When the gas meter is determine its meter health factor in relation to the signal amplitude and the accuracy impacting criteria, the gas meter can determine if dust is affecting its functioning to where service is required at future time interval, or whether service is required immediately. In either instance, the gas meter can inform the head end system that assistance, repair, replacement or recalibration is needed at a later time or needed immediately. In response, the head end system can obtain the assistance needed for the gas meter from external sources.

Figure 5:
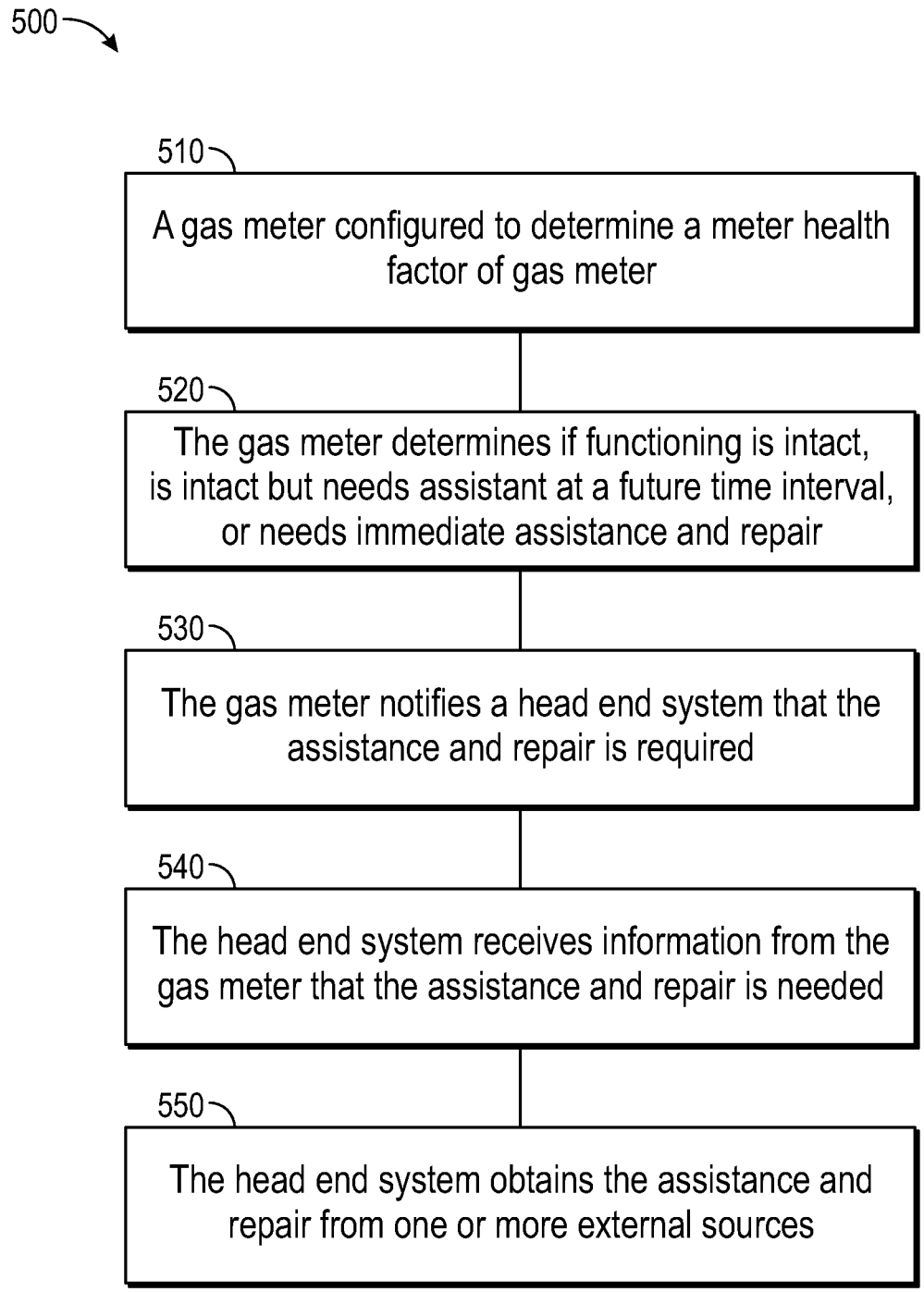
FIG. 5 illustrates a method for the gas meter to determine its meter health factor in accordance with an embodiment.

FIG. 5 illustrates a method 500 wherein the gas meter continuously determines its meter health factor based on the power management criteria, alarm state, ageing criteria, wear out criteria, and accuracy impacting criteria, and determine if its functioning is intact, or its functioning is intact but needs assistance and/or repair at a future time interval, or its functioning is not intact and needs assistance and/or repair right away.

In FIG. 5, at step 510, the gas meter is configured in a gas supply net with a head end system. The gas meter is configured to determine its meter health factor based on the power management criteria, alarm state, ageing criteria, wear out criteria, and accuracy impacting criteria.

In FIG. 5, at step 520, the gas meter determines if its functioning is intact by checking the components/sensors in relation to the alarm state and the criteria's mentioned in step 510. The gas meter determines if its overall functioning is intact. The gas meter can also determine that its function is intact, but that it needs service in relation to one or more of the criteria's or the alarm state mentioned above within the next twelve months or at a future time interval. Further, the gas meter can also determine that some of its functioning needs immediate assistance.

In FIG. 5, at step 530, the gas meter notifies the head end system that it needs assistance and repair. The gas meter will notify the head end system that it needs assistance or repair within the next twelve months, or at a future time interval. The gas meter will also notify the head end system that it needs immediate assistance or even replacement (such as for the battery) or recalibration.

In FIG. 5, at step 540, the head end system receives the information from the gas meter requesting the assistance and repair. The head end system can receive information that the gas meter's functioning is intact, but that it needs assistance and repair within the next twelve months or at a future time interval. In addition, the head end system can also receive the information that the gas meter needs immediate assistance, repair, or recalibration. The head end system can also receive information that the gas meter needs something replaced, such as its battery.

In FIG. 5, at step 550, obtains the required assistance from one or more external sources to provide to the gas meter.

Those skilled in the art will appreciate that the example embodiments are non-exhaustive and that embodiments other than that described here may be included without departing from the scope and spirit of the presently disclosed embodiments.

Advantages

The gas meter can continuously perform a self-check of its overall functioning. As a result, the gas meter will always know ahead of time when service is needed within the next twelve months or at a future time interval. In addition, the gas meter will know immediately when it needs immediate service and repair, or even recalibration. Further, the gas meter will know if it needs a replacement battery.

Further, the gas meter by using distinct criteria's such as a power management criteria, an alarm state, ageing criteria, a wear out criteria, and an accuracy impacting criteria, the gas meter is able to know which part of its functioning is intact, which part of its functioning is intact but needs service within the next twelve months, and which part of its functioning needs immediate assistance, repair, replacement, or recalibration.

With the gas meter being able to continuously perform a self-check and request for assistance and repair from a head end system, the gas meter eliminates the needs for batches of gas meters to be check for proper functioning of outside sources. Further, through continuous self-checking, the gas meter is able to get timely assistance, repair and/or recalibration when required.

Conclusion

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

The invention claimed is:

1. A system comprising:
a gas meter configured to determine a meter health factor based on a power management criteria includes voltage level and energy level of the gas meter, ageing criteria includes long-term of pressure and temperature of the gas meter, wear out criteria includes a total volume counted and a flow rate indicator for the gas meter, accuracy impacting criteria, and an alarm state, wherein the gas meter determines if the meter health factor indicates if functioning is intact but assistance and repair is needed at a future time interval, or if the meter health factor indicates if the functioning is not intact and the assistance and the repair is needed based on the power management criteria, the ageing criteria, the wear out criteria, the accuracy impacting criteria, and the alarm state, and wherein the gas meter notifies a head end system that the meter health factor indicates that the assistance and the repair is required based on the functioning; and
the head end system configured to receive information about the gas meter's meter health factor based on the functioning that indicates that the assistance and the repair is required, wherein the head end system obtains the required assistance and the required repair from one or more external sources.

2. The system of claim 1, wherein a green light for the power management criteria indicates that the meter health factor is intact in relation to the power management criteria.

3. The system of claim 1, wherein the gas meter reports when a battery is damaged or empty to the head end system.

4. The system of claim 1, wherein the gas meter identifies if the pressure and the temperature within the gas meter are normal.

5. The system of claim 1, wherein a yellow light for the wear out criteria indicates that the meter health factor in relation to the wear out criteria is normal but needs to be addressed at the future time interval.

6. The system of claim 1, wherein the gas meter identifies if dust has affected a gain and signal amplitude for an ultrasonic sensor.

7. The system of claim 1, wherein the gas meter continuously determines the functioning based on the power management criteria, the ageing criteria, the wear out criteria, the accuracy impacting criteria, and the alarm state.

8. A system comprising:
a plurality of sensors each configured to provide one or more specific functions;
a gas meter configured to determine a meter health factor based on a power management criteria includes voltage level and energy level of the gas meter, ageing criteria includes long-term at least one of pressure and temperature of the gas meter, wear out criteria includes a total volume counted and a flow rate indicator for the gas meter, accuracy impacting criteria, and an alarm state, wherein the power management criteria, the ageing criteria, the wear out criteria, the accuracy impacting criteria and the alarm state are based on a functioning of the plurality of sensors, wherein the gas meter determines whether the meter health factor indicates whether the functioning of the plurality of sensors is intact, whether the functioning of the plurality of sensors is intact but immediate assistance and a repair is required at a future time interval, or whether the functioning of the plurality of sensors is not intact and the immediate assistance and the repair is required based on the power management criteria, the ageing criteria, the wear out criteria, the accuracy impacting criteria, and the alarm state, and reports to a head end system that the immediate assistance and the repair is required based on the meter health factor; and
the head end system configured to receive information from the gas meter on the meter health factor, wherein the head end system requires for the immediate assistance and the repair from a plurality of external sources to provide the required immediate assistance and the required repair.

9. The system of claim 8, wherein the gas meter continuously monitors the power management criteria to determine if a battery needs to be replaced.

10. The system of claim 8, wherein the gas meter determines if a flow rate profile on the flow rate indicator and the total volume counted are normal.

11. The system of claim 8, wherein the gas meter determines if dust is affecting the accuracy impacting criteria.

12. The system of claim 8, wherein the gas meter determines if the voltage level of the gas meter is normal but also requires the immediate assistance and the repair at the future time interval.

13. The system of claim 8, wherein the gas meter notifies the head end system that the total volume counted and a flow rate profile on the flow rate indicator of the gas meter have to be addressed at the future time interval.

14. The system of claim 8, wherein the gas meter determines that it requires the immediate assistance and the repair due to the voltage level and the energy level of the gas meter.

15. A method comprising:
configuring a gas meter in a gas supply net to determine a meter health factor based on a power management criteria includes voltage level and energy level of the gas meter, ageing criteria includes long-term at least one of pressure and temperature of the gas meter, wear out criteria includes a total volume counted and a flow rate indicator for the gas meter, accuracy impacting criteria, and an alarm state, wherein a plurality of sensors each configured to provide one or more specific functions;
determining, by the gas meter, if the meter health factor indicates if functioning of the plurality of sensors is intact but needs assistance and repair at a future time interval, or if the functioning of the plurality of sensors is not intact and immediate assistance and immediate repair is needed based on the power management criteria, the ageing criteria, the wear out criteria, the accuracy impacting criteria, and the alarm state;
notifying a head end system, by the gas meter, that the meter health factor indicates that the immediate assistance and the immediate repair is required; and
configuring the head end system to receive information about the gas meter that needs the immediate assistance and the immediate repair, wherein the head end system obtains the immediate assistance and the immediate repair from one or more external sources.

16. The method of claim 15, wherein a green light for the power management criteria indicates that the functioning of the plurality of sensors for a battery and the voltage level and the energy level for the gas meter is intact.

17. The method of claim 15, wherein a yellow light for the wear out criteria indicates that the total volume counted and a flow rate profile on the flow rate indicator for the gas meter needs the assistance and the repair at the future time interval.

18. The method of claim 15, wherein the gas meter determines if an accumulation of dust affected a gain and signal amplitude of an ultrasonic sensor configured within the gas meter.

19. The method of claim 15, wherein a red light for the power management criteria indicates that a battery for the gas meter has to be replaced.

20. The method of claim 15, wherein the gas meter determines that the voltage level and the energy level need the assistance and the repair at the future time interval.

* * * * *